Patented Sept. 28, 1943

2,330,527

UNITED STATES PATENT OFFICE 2,330,527

POLYMERIZATION OF STYRENE-TYPE COMPOUNDS

Hanns Peter Staudinger, Ewell, England, assignor to The Distillers Company Limited, Edinburgh, Scotland, a British company No Drawing. Application September 30, 1940, Serial No. 359,157. In Great Britain October 13, 1939

4 Claims. (Cl. 260—86)

The present invention relates to the production of polymerized products from co-polymers of styrene and its nuclear alkyl substituted derivatives with other polymerizable organic compounds.

It is well known that the properties of polymerized styrene are modified by carrying out the polymerization of the monomer in the presence of other polymerizable compounds and it has been proposed "inter alia" to obtain a polymer either soluble in hydrocarbon solvents, or insoluble in such solvents, by the polymerization of styrene with divinylbenzene, and to obtain modified polymerization products by the co-polymerization of aryl-substituted olefines such as styrene with esters of unsaturated acids such as crotonic acid. It has now been found that polymerized products of high molecular weight and having improved physical and mechanical properties can be obtained by effecting the partial polymerization of the aryl-substituted olefines and then copolymerizing with other polymerizable compounds.

According to the present invention polymerization products are obtained from styrene-type compounds, by adding the requisite amount of an ester of crotonic acid having at least two double bonds in the molecule separated from one another by at least one atom of carbon to a mixture of said monomeric styrene-type compounds and polymers of the same and thereafter carrying the polymerization of the mixture to completion.

The method is particularly suitable for obtaining polymerization products from styrene and esters of crotonic acid such as vinyl crotonate and ethylene glycol dicrotonate.

The method of carrying out the invention consists of initiating polymerization of the monomeric reactant, e. g., styrene, by any of the usual methods of effecting polymerization—such as heat treatment, either alone or in the presence of a polymerizing catalyst such as benzoyl peroxide or radiation by ultra violet light, in the absence of any other polymerizable compound and carrying through the polymerization until a substantial amount of polymer has been formed. The initial polymerization may be carried out to such an extent that from about 10 to about 90%, preferably from about 40 to about 65% by weight, of the monomer is polymerized before the addition of the other polymerizable compound is effected. The other polymerizable compound is then introduced into, and thoroughly mixed with, the mixture of monomer and polymer thus obtained, and polymerization is then carried through to completion. Suitable other polymerizable compounds are compounds which have at least two double bonds in the molecule, separated by at least one carbon atom. Ethylene glycol dicrotonate and vinyl crotonate have been found to be particularly suitable. Compounds produced by co-polymerization in accordance with this process in addition to having high molecular weights have the advantage of being thermoplastic, and are particularly suitable for injection moulding. The following are examples of carrying out the process of this invention.

Example 1

100 c.c. of monomeric styrene of 97% purity (the remaining 3% consisting of saturated hydrocarbons such as isopropyl benzene) were heated in an atmosphere of nitrogen for 24 hours at 105° C. until about 70% by weight of the monomer had been polymerized. 0.5 c.c. of vinyl crotonate was then added and polymerization was continued for 24 hours at 115° C. After raising the temperature to about 160° C. and removing non-polymerizable constituents by distillation under reduced pressure, 91 gms. of a transparent resin were obtained, having a molecular weight of 185,000; the resin was thermoplastic and was soluble in benzene.

Example 2

50 gms. of polystyrene (80,000 molecular weight), was dissolved in a mixture of 50 c.c. of monomeric styrene and 3 c.c. of ethylene glycol di-crotonate. The solution was then polymerized in an atmosphere of nitrogen for 72 hours at 105° C. After removal of the non-polymerizable constituents by distillation under reduced pressure, a resin was obtained with a molecular weight of 144,000; the resin was soluble in benzene. It was also thermoplastic and of a rubbery nature when hot.

Example 3

1.2 litres of monomeric styrene of 85% purity (the remaining 15% consisting of inert saturated hydrocarbons) were heated in an oil-heated vacuum-tight kneader for 18 hrs. at 90° to 98° C., during which time 62% of it had polymerized to a polymer of 104,000 molecular weight. 4 grams of sorbitol hexacrotonate, dissolved in 40 ccs. of monomeric styrene, were then added to the mix and the whole was thoroughly kneaded and heating was continued at about 95° C. for 40 hours. Diluent and residual monomeric styrene were removed by vacuum distillation by slowly raising the temperature to 160° C. The resin was removed while still hot and after cooling was broken up into powder suitable for moulding. The molecular weight was found to be 178,000.

The molecular weights were determined by measuring the viscosity of a 2% solution of the resin in a suitable solvent such as benzene in accordance with the method described by Hermann Staudinger in "Der Hochmolekular Verbindungen," published by Verlag Julius Springer of Berlin, in 1932.

What I claim is:

1. The production of a styrene-type polymerization product by subjecting an admixture of styrene with polymers thereof to polymerizing conditions, in the presence of an ester of crotonic acid having at least two double bonds in the molecule separated from one another by at least one carbon atom, until substantially complete polymerization is effected.

2. The production of a styrene-type polymerization product by subjecting styrene to polymerizing conditions whereby polymerization thereof ensues, interrupting the polymerization prior to completion thereof whereby an admixture of unpolymerized and polymerized styrene results, incorporating an ester of crotonic acid having at least two double bonds in the molecule separated from one another by at least one carbon atom into the product, and thereafter substantially completing the polymerization of the admixture.

3. The process according to claim 1, wherein the admixture of styrene with polymers thereof contains from about 10 to about 90 per cent by weight of styrene polymers.

4. The process according to claim 1, wherein the admixture of styrene with polymers thereof contains from about 40 to about 65 per cent by weight of styrene polymers.

HANNS PETER STAUDINGER.